(12) United States Patent
Yang et al.

(10) Patent No.: US 7,503,708 B2
(45) Date of Patent: Mar. 17, 2009

(54) PAN AND TILT APPARATUS USABLE WITH A CAMERA

(75) Inventors: Soo Sang Yang, Suwon-Si (KR); Yong Jae Kim, Seoul (KR); Yeon Taek Oh, Yongin-Si (KR); Youn Baek Lee, Suwon (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 264 days.

(21) Appl. No.: 11/061,509

(22) Filed: Feb. 22, 2005

(65) Prior Publication Data

US 2006/0039687 A1  Feb. 23, 2006

(30) Foreign Application Priority Data

Aug. 18, 2004 (KR) .............. 10-2004-0065188

(51) Int. Cl.
*G03B 17/00* (2006.01)
*H04N 5/228* (2006.01)

(52) U.S. Cl. .............. 396/427; 348/208.3; 224/908

(58) Field of Classification Search ............. 396/12, 396/13, 58, 427, 428; 224/908; 348/208.3
See application file for complete search history.

(56) References Cited

U.S. PATENT DOCUMENTS

| 5,907,730 | A | * | 5/1999 | Tseng et al. | .............. | 396/428 |
| 5,930,544 | A | * | 7/1999 | Tseng et al. | .............. | 396/529 |
| 2003/0077082 | A1 | | 4/2003 | Ito | | |
| 2004/0027541 | A1 | * | 2/2004 | Angerpointner | ............ | 352/243 |

FOREIGN PATENT DOCUMENTS

| KR | 20-273675 | 4/2002 |
| KR | 2002-63676 | 8/2002 |
| KR | 20-326661 | 9/2003 |

* cited by examiner

*Primary Examiner*—Rochelle-Ann J Blackman
(74) *Attorney, Agent, or Firm*—Stanzione & Kim, LLP

(57) ABSTRACT

A pan and tilt apparatus usable with a camera, and more particularly, a driving mechanism to linearly maintain a tilting angle of the camera relative to a rotating angle of a tilt motor. The pan and tilt apparatus includes a tilting driving mechanism having the tilt motor to induce tilting motion of the camera, a panning driving mechanism to induce panning motion of the camera, and a link device to transmit a driving force of the tilt motor to the camera, such that the tilting angle of the camera varies linearly relative to the rotating angle of the tilt motor.

31 Claims, 11 Drawing Sheets

PAN AND TILT APPARATUS USABLE WITH A CAMERA

CROSS-REFERENCE TO RELATED APPLICATIONS

This application claims the benefit of Korean Patent Application No. 2004-65188, filed on Aug. 18, 2004, in the Korean Intellectual Property Office, the disclosure of which is incorporated herein in its entirety by reference.

BACKGROUND OF THE INVENTION

1. Field of the Invention

The present general inventive concept relates to a pan and tilt apparatus usable with a camera, and more particularly, to a driving mechanism to cause panning and tilting motions of a camera.

2. Description of the Related Art

A pan and tilt apparatus usable with a camera is an apparatus to rotate the camera mounted therein, about both a vertical and a horizontal axes in order to expand a filming region of the camera. The pan and tilt apparatus has two basic motions including a tilting motion (i.e., rotation in a vertical direction) and a panning motion (i.e., rotation in a horizontal direction).

As an example of a conventional camera panning and tilting apparatus, Korean Utility Registration No. 273675 discloses a pan and tilt camera comprising a signal input unit having various signal input means for complete scanning of a location of interest, a housing containing a control unit which processes input signals of the signal input unit and a pan motor which rotates upon receiving commands from the control unit, a rotating plate provided with a tilt motor and a monitoring camera using a bracket, and a horizontal rotating device coupled to the housing by means of a shaft and adapted to cause the rotating plate, in a fixed position, to undergo a horizontal rotation under operation of the pan motor.

The above described pan and tilt camera, however, experiences a problem in that the pan motor unnecessarily rotates the tilt motor, in addition to the camera, because of an excessive load applied thereto.

In an attempt to solve the problem described above, Korean Patent Publication No. 2002-63676 discloses a pan and tilt driving apparatus usable with a camera basically comprising a camera mounting structure, an independent-motion transmission unit for allowing panning and tilting motions of the camera mounting structure to be independently performed relative to each other, a panning motion performing unit usable with the camera mounting structure, a tilting motion performing unit usable with the camera mounting structure, and a fixed plate which supports both the panning motion and tilting motion performing units.

The panning motion performing unit includes panning driving means (e.g., an electric motor), a driving gear driven by the pan driving means, and a driven gear that engages and is rotated by the driving gear and is coupled to one end of a fixed frame. The tilting motion performing unit includes tilting driving means (e.g., an electric motor), a pinion rotated by the tilting driving means, and a rack that engages and is vertically moved by the pinion to vertically move the camera mounting structure.

The tilting motion in the above described pan and tilt driving apparatus is achieved at a rear end of the camera, which is hingeably coupled to the fixed frame, and rotates about a hinge axis thereof while being vertically shaken when the rack is vertically moved along the pinion rotated by the tilting driving means. With such a structure, however, since a tilting angle of the camera varies in a non-linear pattern relative to a rotating angle of the motor, an algorithm for calculating the relationship between the tilting angle of the camera and the rotating angle of the motor is needed in order to control the tilting angle of the camera to a desired value. This calculation is complex and results in difficult control operations to be performed by a control unit.

SUMMARY OF THE INVENTION

The present general inventive concept provides a pan and tilt apparatus usable with a camera, which is easily drivable by virtue of a reduced load on a pan motor thereof.

The present general inventive concept also provides a pan and tilt apparatus usable with a camera, which is easily controllable by enabling a tilting angle of the camera to vary linearly relative to a rotating angle of a tilt motor that causes a tilting motion.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a pan and tilt apparatus usable with a camera comprising a tilting driving mechanism having a tilt motor to induce a tilting motion of the camera, a panning driving mechanism to induce a panning motion of the camera, and a link device to transmit a driving force of the tilt motor to the camera such that a tilting angle of the camera linearly varies relative to a rotating angle of the tilt motor.

The tilting driving mechanism may further include a decoupling unit to enable the tilting and panning motions of the camera to be independently performed.

The panning driving mechanism may include a main shaft rotatable about a center axis thereof to perform the panning motion, and a pan motor to rotate the main shaft.

The panning driving mechanism may further include a belt transmission device to transmit a driving force of the pan motor to the main shaft.

The pan and tilt apparatus may further comprise a pan bracket fixed to the main shaft to integrally rotate with the main shaft, and a tilt bracket hingeably coupled to the pan bracket having the camera mounted thereon to perform the tilting motion.

The decoupling unit may include a linear guide that vertically moves along the main shaft, and a rotor that vertically moves along with the linear guide and is installed to rotate on the linear guide about the main shaft.

The decoupling unit may further include a bearing interposed between the linear guide and the rotor.

The link device may include a first tilt link having a rotatable first end at a fixed-position to be rotated by the driving force of the tilt motor, a second tilt link having a first end hingeably coupled to a second free end of the first tilt link and a second end hingeably coupled to the linear guide to vertically move the decoupling unit, and a third tilt link having a first end hingeably coupled to the rotor and a second end hingeably coupled to the tilt bracket to vertically rotate the tilt bracket according to vertical movement of the decoupling unit, thereby causing the tilting motion of the camera.

A rotating angle of the first tilt link may coincide with the tilting angle of the camera.

A first distance, between a hingeable coupling center of the tilt and pan brackets and a hingeable coupling center of the tilt bracket and the third tilt link, may be equal to a second distance between a rotation center of the first tilt link and a hingeable coupling center of the first and second tilt links, and a first vertical distance between the hingeable coupling center of the tilt and pan brackets and the rotation center of the first tilt link, a second vertical distance between the hingeable coupling center of the tilt bracket and the third tilt link and the hingeable coupling center of the first and second tilt links, and a third vertical distance between a hingeable coupling center of the rotor and the third tilt link and a hingeable coupling center of the linear guide and the second tilt link, may coincide with one another.

The tilting driving mechanism may further include a transmission shaft connected to a rotating center of the first tilt link to transmit the driving force of the tilt motor to the first tilt link, and gears to transmit the driving force of the tilt motor to the transmission shaft.

The transmission shaft and a driving shaft of the tilt motor may intersect each other, and the gears may be bevel gears.

The foregoing and/or other aspects and advantages of the present general inventive concept are also achieved by providing a pan and tilt apparatus usable with a camera, comprising a camera to film an object, brackets to support the camera in a vertically rotatable manner to enable a tilting motion, a main shaft rotatable about a center axis thereof to enable a panning motion, a lifting unit vertically movable on the main shaft, and a link device linked to the brackets and the lifting unit to cause the tilting motion.

The lifting unit may include a linear guide that vertically moves along the main shaft, and a rotor that vertically moves along with the linear guide and being installed to rotate on the linear guide about the main shaft.

The brackets may include a pan bracket fixed to the main shaft to integrally rotate with the main shaft, and a tilt bracket hingeably coupled to the pan bracket and having the camera mounted thereon to perform the tilting motion.

The link device may include a first tilt link having a rotatable first end at a fixed-position to rotate, a second tilt link having a first end hingeably coupled to a second free end of the first tilt link and a second end hingeably coupled to the linear guide to vertically move the lifting unit, and a third tilt link having a first end hingeably coupled to the rotor and a second end hingeably coupled to the tilt bracket to vertically rotate the tilt bracket according to vertical movement of the lifting unit, thereby causing the tilting motion of the camera.

The pan and tilt apparatus may further comprise a tilt motor to drive the link device, and a tilting angle of the camera may vary linearly relative to a rotating angle of the tilt motor.

The pan and tilt apparatus may further comprise a pan motor to rotate the main shaft, and a transmission device to transmit a driving force of the pan motor to the main shaft.

BRIEF DESCRIPTION OF THE DRAWINGS

These and/or other aspects and advantages of the general inventive concept will become apparent and more easily appreciated from the following description of the embodiments, taken in conjunction with the accompanying drawings of which.

DETAILED DESCRIPTION OF THE PREFERRED EMBODIMENTS

Figure 1:
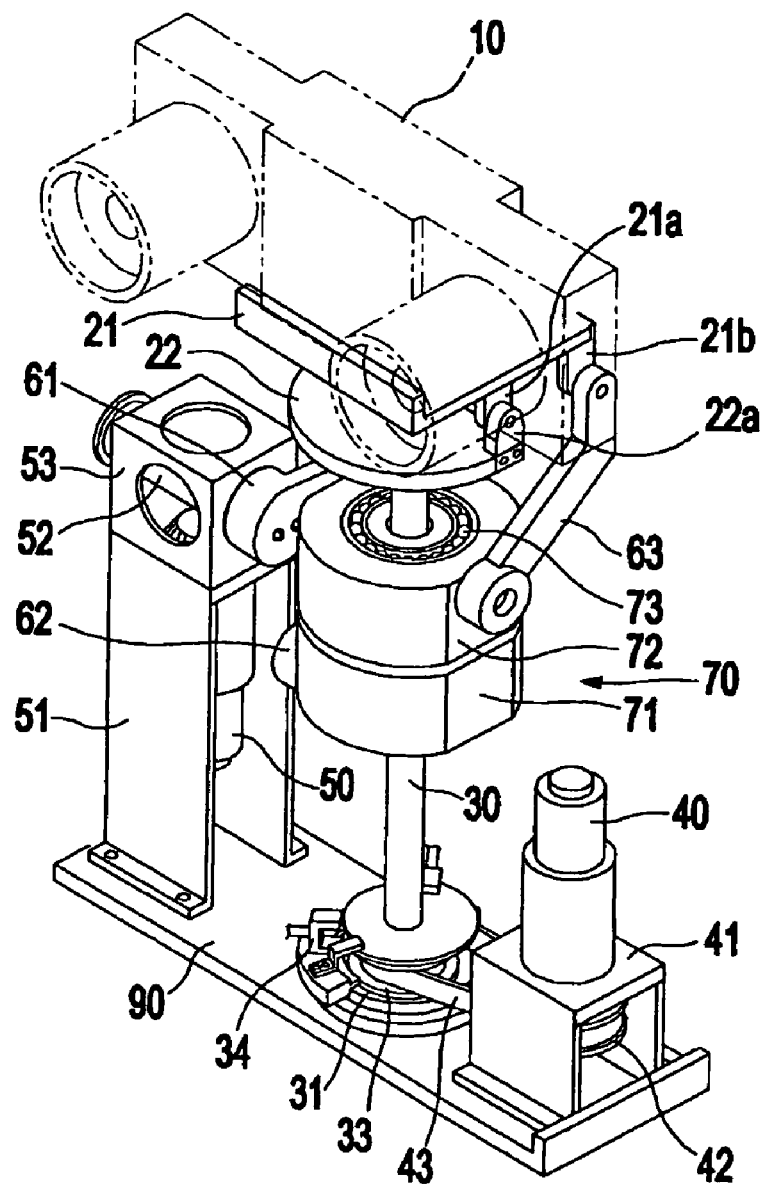
FIG. 1 is a perspective view illustrating a pan and tilt apparatus usable with a camera in accordance with an embodiment of the present general inventive concept.

Reference will now be made in detail to embodiments of the present general inventive concept, examples of which are illustrated in the accompanying drawings, wherein like reference numerals refer to the like elements throughout. The embodiments are described below to explain the present general inventive concept by referring to the figures.

As described above, a pan and tilt apparatus usable with a camera is an apparatus adapted to rotate in both vertical and horizontal directions in order to expand a filming region of the camera. Here, the horizontal rotation of the camera is referred as a "panning motion" creating a panoramic effect, and the vertical rotation of the camera is referred as a "tilting motion."

Figure 2:
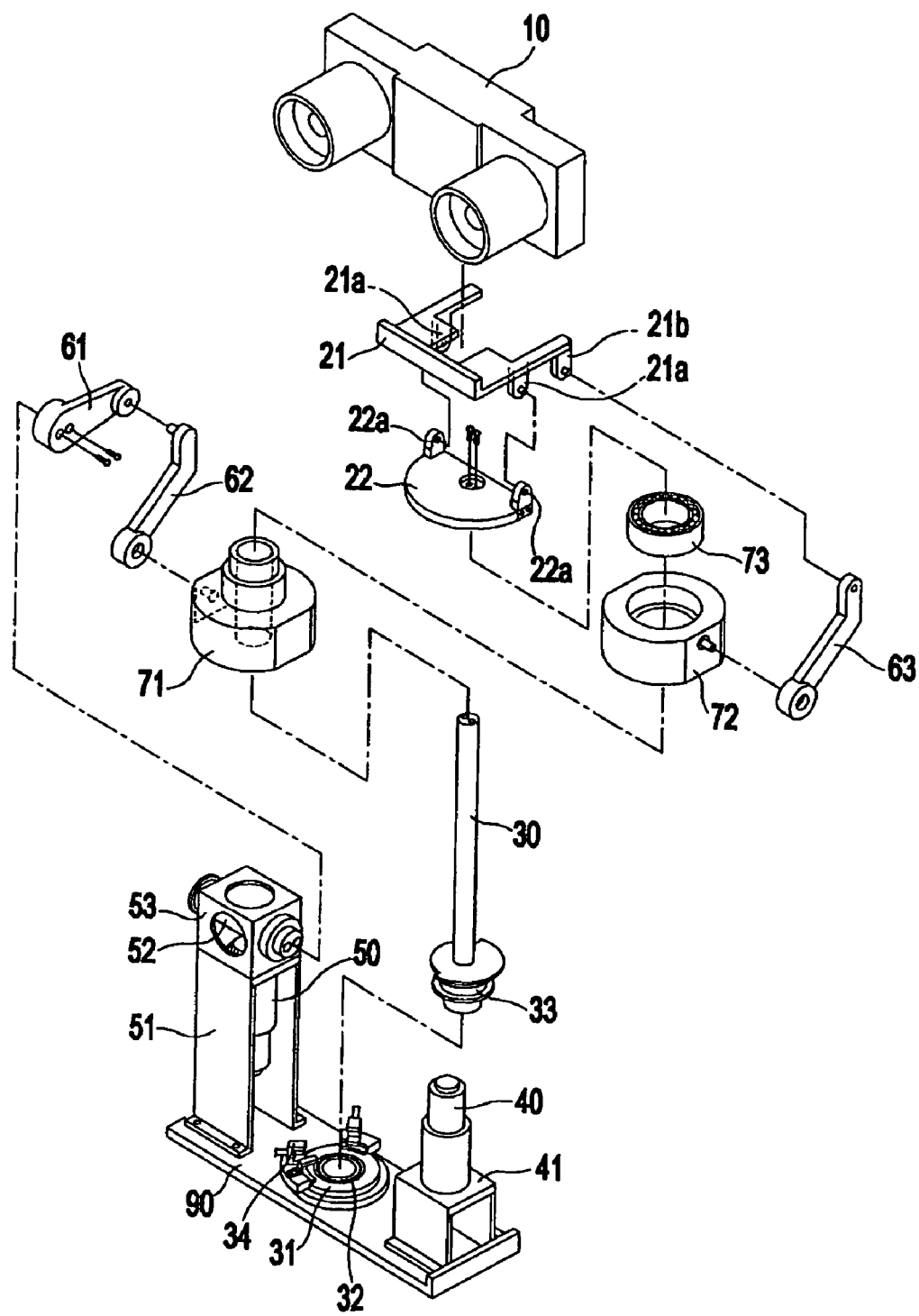
FIG. 2 is an exploded perspective view of the pan and tilt apparatus of FIG. 1.
Figure 3:
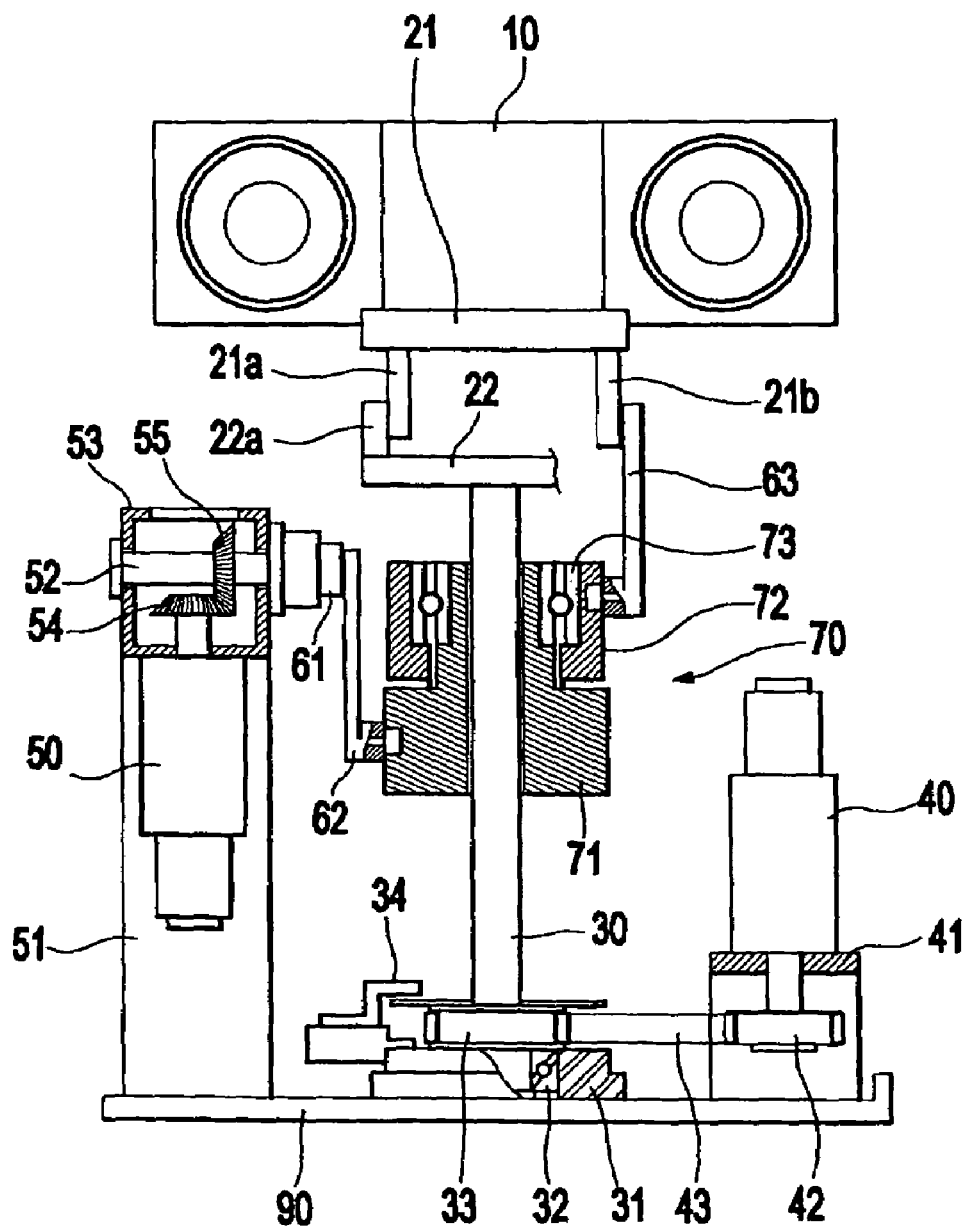
FIG. 3 is a front view of the pan and tilt apparatus of FIG. 1.
Figure 4:
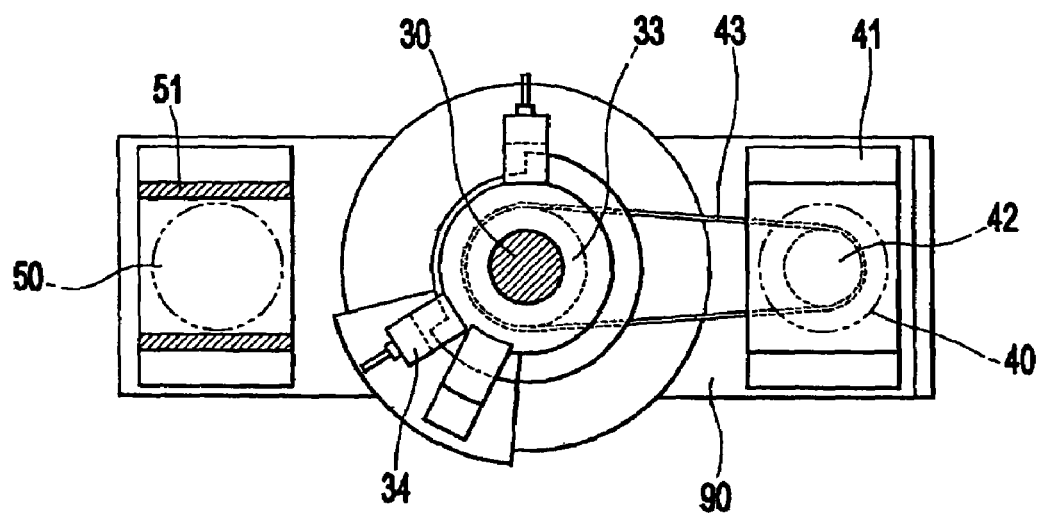
FIG. 4 is a cross sectional view of the pan and tilt apparatus of FIG. 1.

FIG. 1 is a perspective view illustrating a pan and tilt apparatus usable with a camera in accordance with an embodiment of the present general inventive concept. FIGS. 2 to 4 are an exploded perspective view, a front view, and a cross sectional view of the pan and tilt apparatus of FIG. 1, respectively. Now, the general structure of the pan and tilt apparatus usable with a camera in accordance with the present general inventive concept will be described with reference to FIGS. 2 to 4.

The pan and tilt apparatus in accordance with the present general inventive concept comprises a camera 10 to film a desired object, a tilting driving mechanism to cause a tilting motion of the camera 10, a panning driving mechanism to cause a panning motion of the camera 10, a pair of brackets 21 and 22 on which the camera 10 is disposed, and a base 90 to support the panning driving and tilting driving mechanisms.

The brackets 21 and 22, on which the camera 10 is disposed, include a tilt bracket 21 and a pan bracket 22, which are hingeably coupled to each other to rotate in a vertical direction. The body of the camera 10 is fixed at an upper surface of the tilt bracket 21. The tilt bracket 21 has a pair of first hingeable coupling portions 21a and a single second hingeable coupling portion 21b, which extend downward from opposite lateral sides of a lower surface of the tilt bracket 21. The first hingeable coupling portions 21a are formed with respective protrusions to be hingeably coupled to the pan bracket 22. The second hingeable coupling portion 21b, spaced apart from one of the first hingeable coupling portions 21a by a predetermined distance, is hingeably coupled to the tilting driving mechanism. A pair of third hingeable coupling portions 22a are provided on opposite lateral sides of an upper surface of the pan bracket 22 such that the third hingeable coupling portions 22a are hingeably coupled to the first hingeable coupling portions 21a of the tilt bracket 21, respectively.

A main shaft 30 is centrally installed on the base 90 so that the main shaft 30 is rotatable about its center axis. The main shaft 30 supports the brackets 21 and 22. An upper end of the main shaft 30 is fixed to a lower surface of the pan bracket 22, such that, upon rotation, the main shaft 30 integrally rotates the brackets 21 and 22 and the camera 10, thereby causing the panning motion. A lower end of the main shaft 30 is surrounded and supported by a main shaft supporting ring 31 provided at the center of the base 90. A bearing 32 (see FIGS. 2 and 3) is interposed between the main shaft 30 and the main shaft supporting ring 31 to provide smooth rotation of the main shaft 30. A sensor 34 to detect a rotating angle of the main shaft 30 may be provided at a certain position along the periphery of the main shaft 30.

A pan motor 40 to generate a driving force required to cause the panning motion may be provided on a side of the base 90. The pan motor 40 is installed on a pan motor supporting structure 41 fixed on the base 90 so that a driving shaft of the pan motor 40 occupies a lower portion of the pan motor 40. A belt transmission device is provided to transmit the driving force of the pan motor 40 to the main shaft 30. The belt transmission device comprises a driving pulley 42 provided at the driving shaft of the pan motor 40, a driven pulley 33 provided at a lower portion of the main shaft 30, and a belt 43 wound around both the driving pulley 42 and the driven pulley 33.

The pan motor 40, belt transmission device, and the main shaft 30 constitute the panning driving mechanism to cause the panning motion of the camera 10.

A tilt motor 50 to generate a driving force required to cause the tilting motion may be provided at an opposite side of the base 90 relative to the pan motor 40. The tilt motor 50 is installed in a tilt motor supporting structure 51 fixed on the base 90 so that a driving shaft of the tilt motor 50 occupies an upper portion of the tilt motor 50. A transmission shaft 52 to transmit the driving force of the tilt motor 50 to the camera 10 is provided on the tilt motor 50. The transmission shaft 52 extends perpendicular to a direction along which the driving shaft of the tilt motor 50 extends so that one end thereof faces the main shaft 30. A transmission shaft supporting structure 53 is coupled to the tilt motor supporting structure 51 to rotatably support opposite end portions of the transmission shaft 52. A driving gear 54 (see FIG. 3) to transmit the driving force of the tilt motor 50 to the transmission shaft 52 is fixed at the driving shaft of the tilt motor 50. Additionally, a driven gear 55 that engages the driving gear 54 is fixed at the transmission shaft 52 (see FIG. 3). The driving gear 54 and the driven gear 55 may be bevel gears to transmit the driving force between two intersecting axes.

The transmission shaft 52 is connected with a link device to cause the tilting motion of the camera 10, and a decoupling unit 70 is provided at the middle of the link device. The decoupling unit 70 enables the panning motion and the tilting motion of the camera 10 to be independently conducted.

The decoupling unit 70 comprises a linear guide 71, which vertically moves along the main shaft 30 and a rotor 72, which vertically moves along with the linear guide 71. The rotor 72 is also rotatable relative to an axial direction of the main shaft 30. The linear guide 71 takes a multi-stepped form to have a downwardly increasing outer diameter, and an upper half portion of the linear guide 71 is inserted into the center of the rotor 72. The rotor 72 rests on the linear guide 71 to provide substantial resistance to relative vertical movement between the rotor 72 and the linear guide 71. That is, the rotor 72 is only rotatable around the linear guide 71. A bearing 73 to make rotation of the rotor 72 smooth is interposed between the rotor 72 and the linear guide 70.

The link device comprises first, second, and third tilt links 61, 62, and 63, respectively. The first tilt link 61 is fixed at one end thereof to the transmission shaft 52 so that it is rotated by the transmission shaft 52. The second tilt link 62 is hingeably coupled at one end thereof to an opposite free end of the first tilt link 61, and is also hingeably coupled at an opposite end thereof to an outer peripheral surface of a lower half portion of the linear guide 71. The third tilt link 63 is hingeably coupled at one end thereof to an outer peripheral surface of the rotor 72, and is also hingeably coupled at an opposite end thereof to the second hingeable coupling portion 21b of the tilt bracket 21.

The tilt motor 50, the transmission shaft 52, the link device, and the decoupling unit 70 constitute the tilting driving mechanism.

Now, the operation of the pan and tilt apparatus usable with the camera 10 as stated above will be described. Since the pan and tilt apparatus in accordance with the above described embodiment is designed to perform the tilting motion independently of the panning motion, the tilting motion will be described first.

Figure 5A:
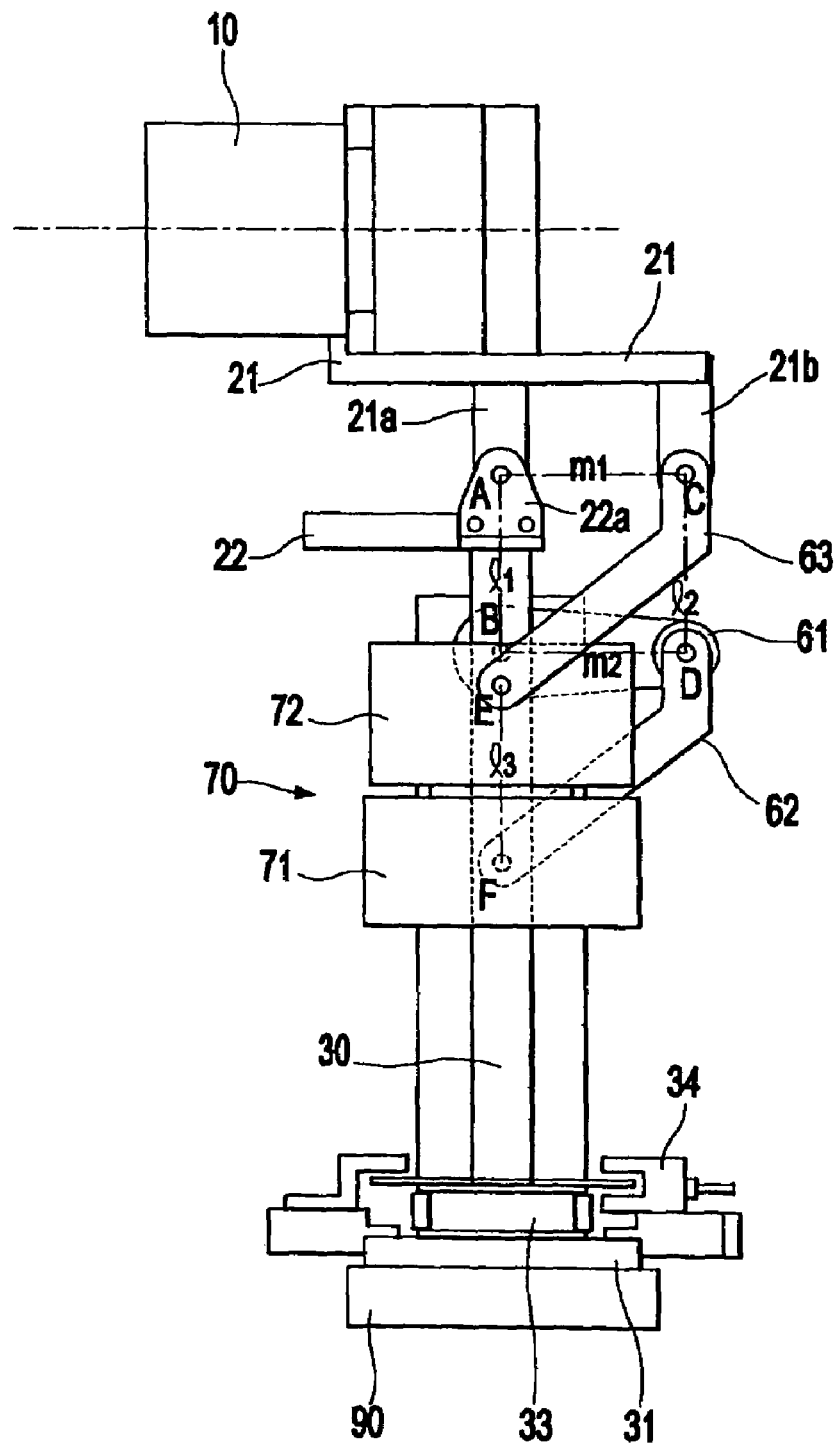
FIG. 5A is a side view of the pan and tilt apparatus of FIG. 1.
Figure 5B:
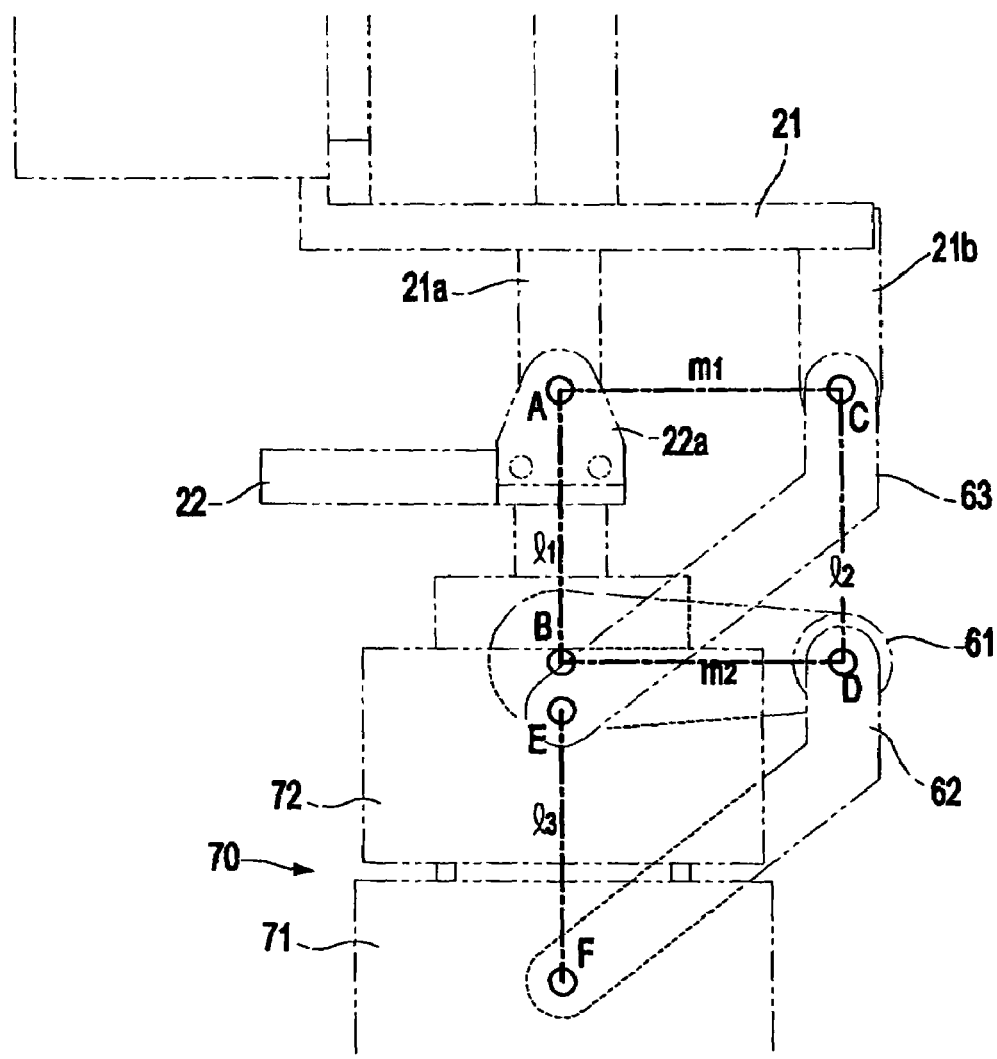
FIG. 5B is an enlarged view illustrating a moving portion of the pan and tilt apparatus of FIG. 5A.
Figure 6A:
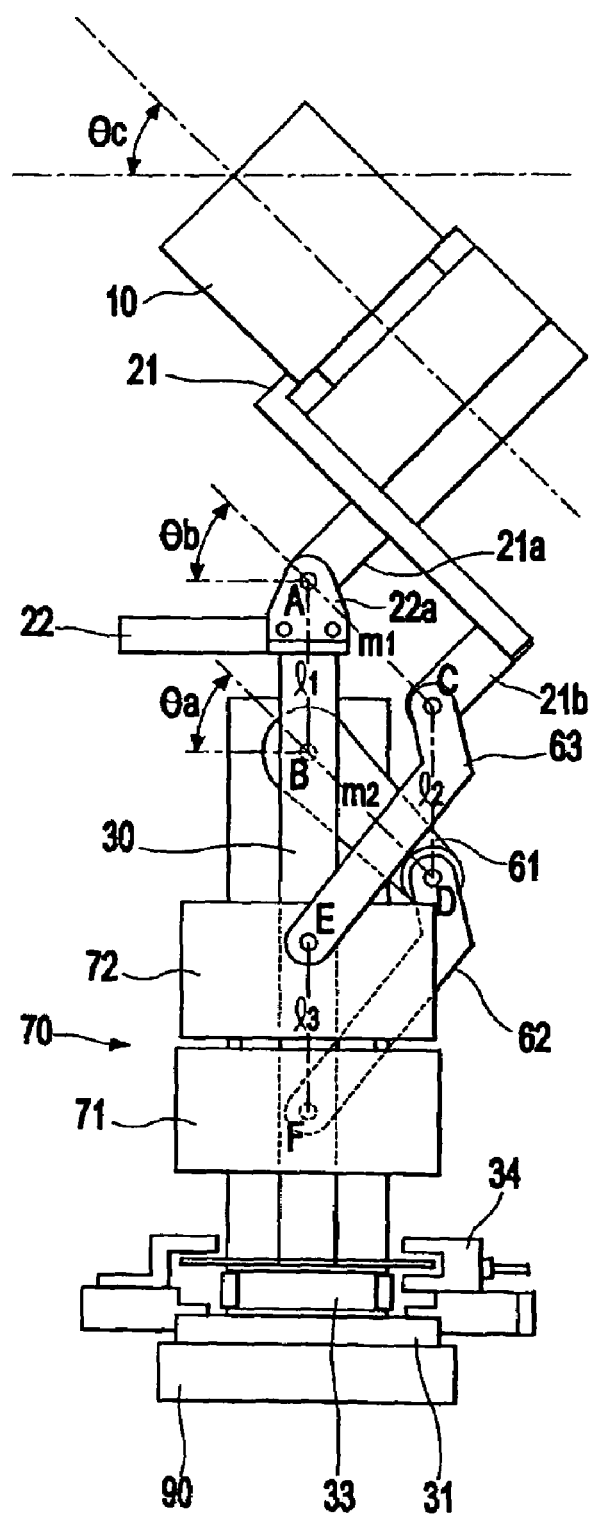
FIG. 6A is a side view illustrating an upward tilting motion of the pan and tilt apparatus of FIG. 1.
Figure 6B:
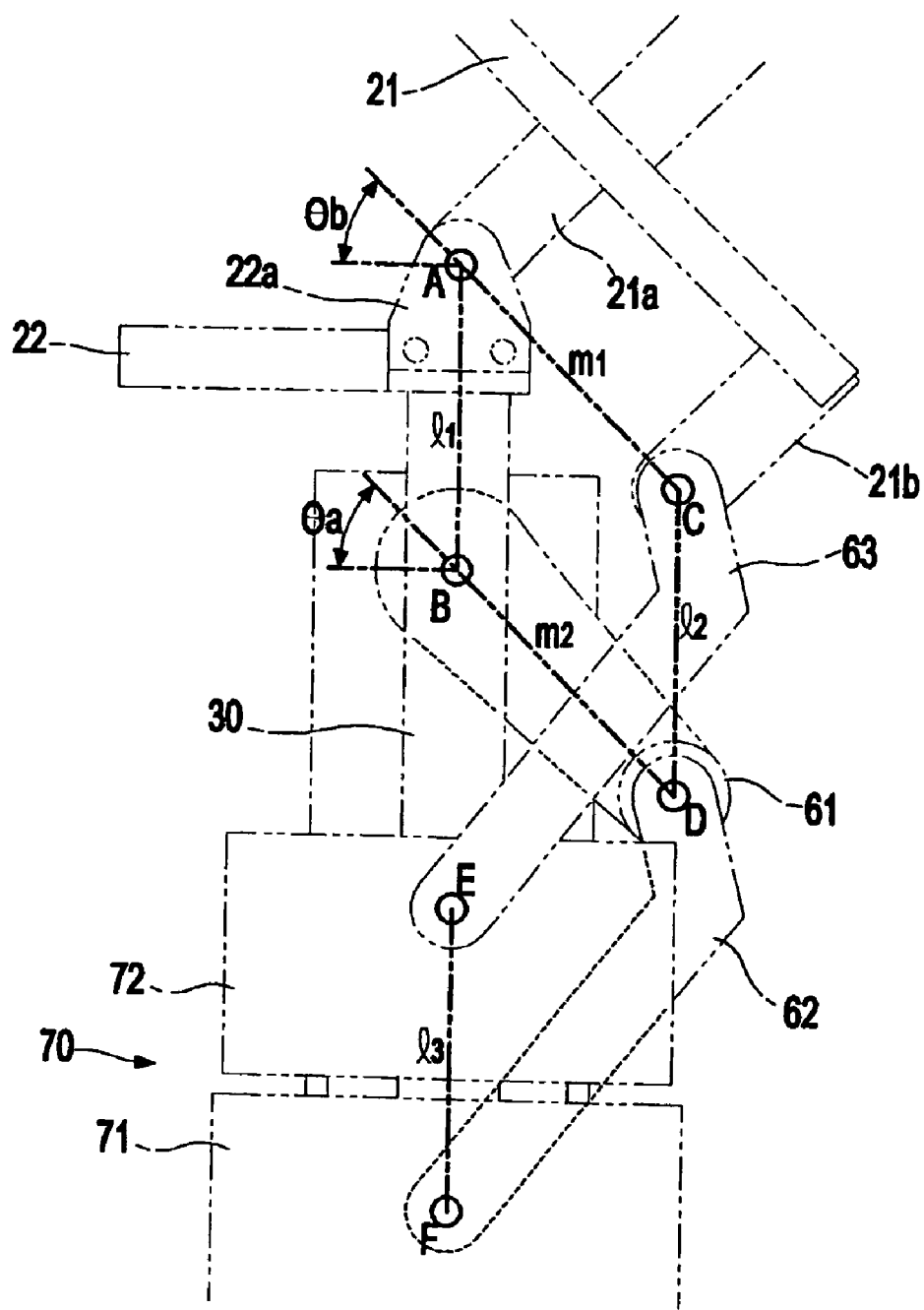
FIG. 6B is an enlarged view illustrating the moving portion of the pan and tilt apparatus of FIG. 6A.

FIGS. 5A and 5B are side views of the pan, and tilt apparatus, in a state wherein the camera 10 faces a front side of the pan and tilt apparatus, and FIGS. 6A and 6B are side views illustrating the tilting motion of the pan and tilt apparatus of FIG. 1.

As the tilt motor 50 is driven, the driving force of the tilt motor 50 is transmitted to the transmission shaft 52 via the driving gear 54 provided at the end of the driving shaft of the tilt motor 50 to rotate the transmission shaft 52. Then, the first tilt link 61, fixed to the end of the transmission shaft 52, is rotated about the transmission shaft 52 by a rotating force of the transmission shaft 52 such that the first tilt link 61 pushes down the second tilt link 62 connected to the opposite end thereof, as illustrated in FIG. 6A. The opposite end of the second tilt link 62 also pushes down the linear guide 71, which moves linearly and vertically along the main shaft 30. Since the rotor 72, which is coupled to the linear guide 71, is restricted to provide substantial resistance to relative vertical movement between the rotor 72 and the linear guide 71, the rotor 72 moves downward along with the linear guide 71. As a result, the third tilt link 63, which is connected at one end thereof to the rotor 72 and at the opposite end thereof to the second hingeable coupling portion 21b of the tilt bracket 21 pulls down the second hingeable coupling portion 21b of the tilt bracket 21 when the third tilt link 63 moves downward following the rotor 72, thereby causing the tilt bracket 21 to rotate upward about the first hingeable coupling portions 21a. In this manner, the camera 10 is also rotated upward, resulting in the tilting motion.

Hereinafter, the relationship between a rotating angle of the tilt motor 50 and a tilting angle of the camera 10 will be described.

In the pan and tilt apparatus usable with the camera 10 according to the present general inventive concept, the driving force of the tilt motor 50 is transmitted to the transmission shaft 52 via the bevel gears 54 and 55, and the first tilt link 61, connected at one end thereof to the transmission shaft 52, rotates in a range of a rotating angle of the transmission shaft 52. If a gear ratio of the driving gear 54 to the driven gear 55 is 1:1, the rotating angle of the tilt motor 50 coincides with the rotating angle of the transmission shaft 52, and consequently coincides with a rotating angle ($\theta a$) of the first tilt link 61.

The tilting angle ($\theta c$) of the camera 10 is equal to a rotating angle ($\theta b$) of the tilt bracket 21 on which the camera 10 is fixed.

Referring to FIGS. 6A and 6B, reference alphanumeric character $m_1$ indicates a distance between a hingeable coupling center (A) of the tilt and pan brackets 21 and 22 and a hingeable coupling center (C) of the tilt bracket 21 and the third tilt link 63. Reference alphanumeric character $m_2$ indicates a distance between a rotation center (B) of the first tilt link 61 and a hingeable coupling center (D) of the first and second tilt links 61 and 62. Here, the distance ($m_1$) is equal to the distance ($m_2$). In addition, reference alphanumeric character $I_1$ indicates a vertical distance between the hingeable coupling center (A) of the tilt and pan brackets 21 and 22 and the rotation center (B) of the first tilt link 61, reference alphanumeric character $I_2$ indicates a vertical distance between the hingeable coupling center (C) of the tilt bracket 21 and the third tilt link 63 and the hingeable coupling center (D) of the first and second tilt links 61 and 62, and reference alphanumeric character $I_3$ indicates a vertical distance between a hingeable coupling center (E) of the rotor 72 and the third tilt link 63 and a hingeable coupling center (F) of the linear guide 71 and the second tilt link 62. Here, the respective vertical distances refer to a height difference on the basis of the base 90, and are equal to one another. As stated above, the pan and tilt apparatus usable with the camera 10 is configured to fulfill relational expressions of $m_1=m_2$ and $I_1=I_2=I_3$.

According to the geometrical relationship described above, a rectangle (ABCD) forms a parallelogram, and the rotating angle (θb) of the tilt bracket 21 is equal to the rotating angle (θa) of the first tilt link 61. Therefore, when the gear ratio of the driving gear 54 to the driven gear 55 is 1:1, the tilting angle (θc) of the camera 10 coincides with the rotating angle of the tilt motor 50. Further, even if the gear ratio of the driving gear 54 to the driven gear 55 is not 1:1, the tilting angle (θc) of the camera 10 is equal to the rotating angle (θa) of the first tilt link 61, and the rotating angle (θa) of the first tilt link 61 varies linearly with respect to the rotating angle of the tilt motor 50. As a result, the tilting angle (θc) of the camera 10 maintains a linear relationship with the rotating angle of the tilt motor 50.

Figure 7A:
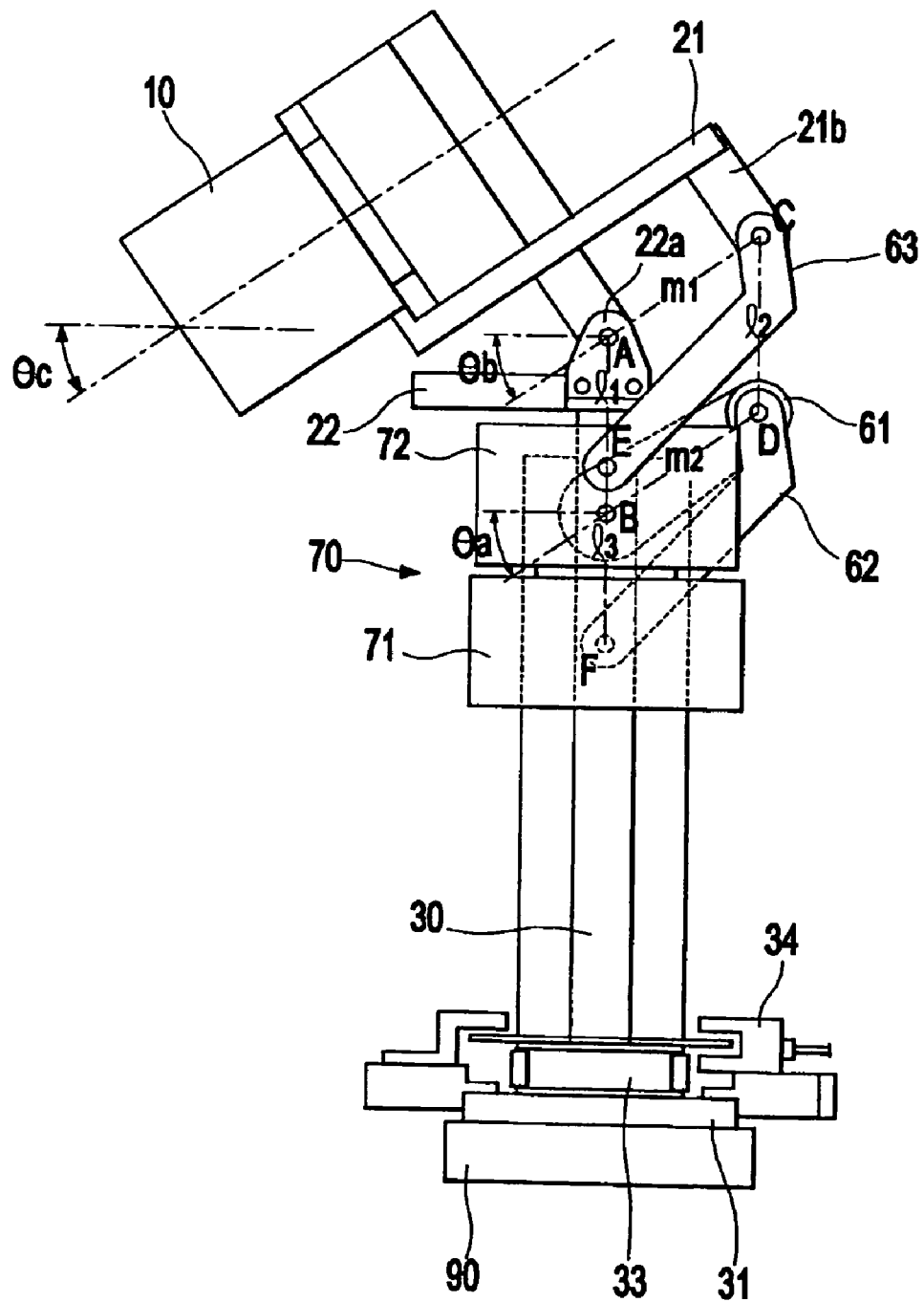
FIG. 7A is a side view illustrating a downward tilting motion of the pan and tilt apparatus of FIG. 1.
Figure 7B:
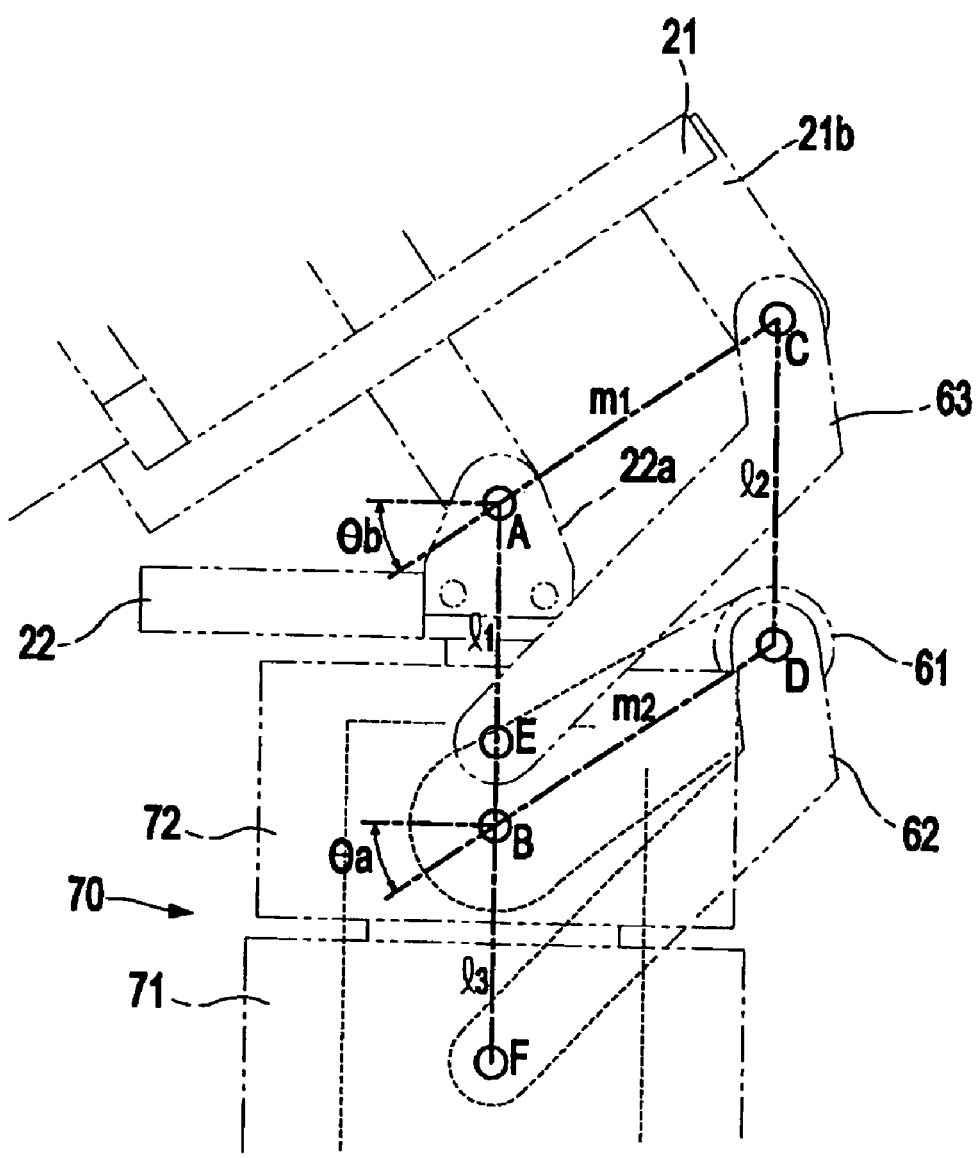
FIG. 7B is an enlarged view illustrating the moving portion of the pan and tilt apparatus of FIG. 7A.

FIGS. 7A and 7B are views illustrating another tilting motion of the camera 10, when the tilt motor 50 rotates in a direction opposite to the direction illustrated in FIGS. 6A and 6B. By rotation of the tilt motor 50, the first tilt link 61 pulls up the second tilt link 62, and thus the third tilt link 63, connected to the rotor 72, pushes up the second hingeable coupling portion 21b of the tilt bracket 21 as the linear guide 71 and the rotor 72 move upward together, thereby tilting the camera 10 downward. In the same manner as in FIGS. 6A and 6B, the tilting angle (θc) of the camera 10, the rotating angle (θb) of the tilt bracket 21, and the rotating angle (θa) of the first tilt link 61 coincide with one another. The rotating angle (θa) of the first tilt link 61 is equal to the rotating angle of the transmission shaft 52, and the rotating angle of the transmission shaft 52 maintains the linear relationship described above with the rotating angle of the tilt motor 50. As a result, the tilting angle (θc) of the camera 10 is in the linear relationship with the rotating angle of the tilt motor 50.

Now, the panning motion of the pan and tilt apparatus usable with the camera 10 according to the above embodiment will be described.

Figure 8:
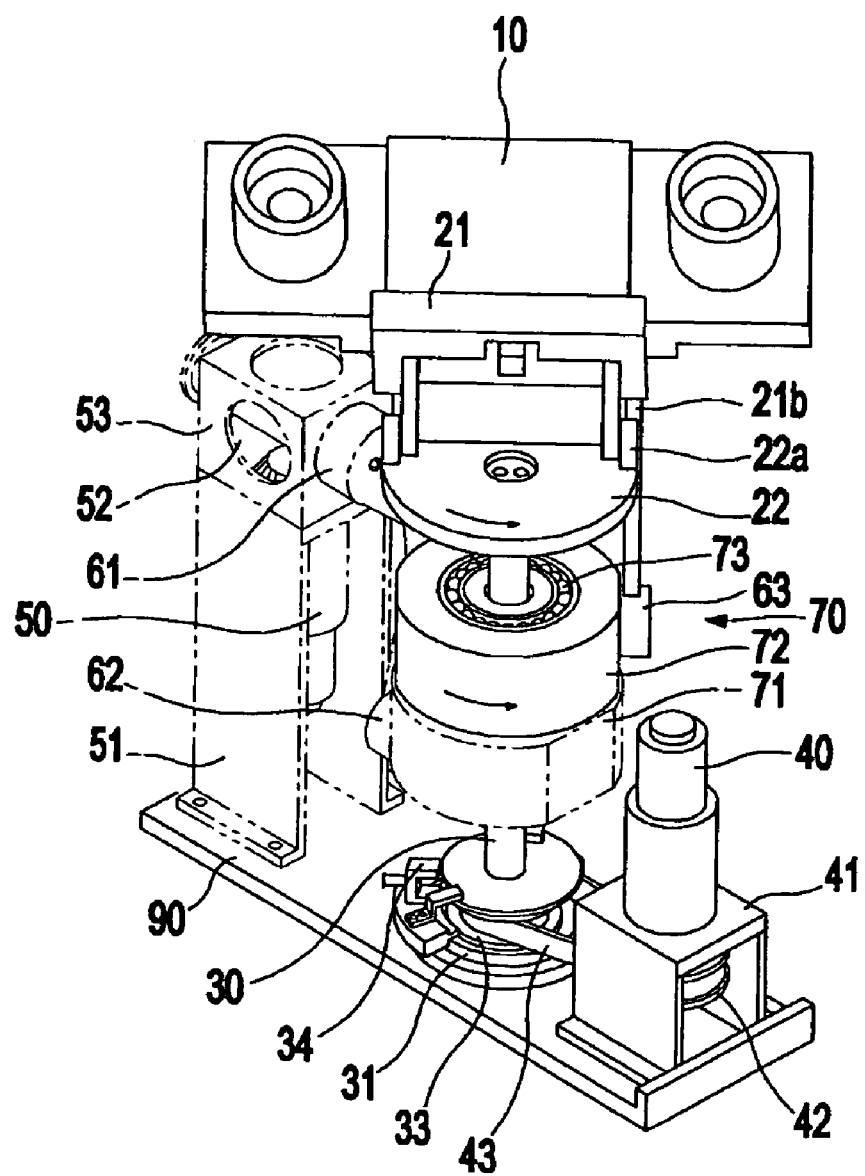
FIG. 8 is a perspective view illustrating a panning motion of the pan and tilt apparatus of FIG. 1.

FIG. 8 is a perspective view illustrating the panning motion of the pan and tilt apparatus, in a state wherein the camera 10 is tilted upward. In FIG. 8, basic components used in the panning motion are represented by solid lines, and other components are represented by dotted lines.

As the pan motor 40 is driven, the driving pulley 42 installed at the driving shaft of the pan motor 40 rotates, and the rotating force of the driving pulley 42 is transmitted to the driven pulley 33 provided at the main shaft 30 via the belt 43. Thereby, the main shaft 30 is rotated, causing the pan bracket 22, the tilt bracket 21 and the camera 10 connected thereto to rotate altogether. In this manner, the panning motion of the camera 10 is achieved.

Since the third tilt link 63 is connected to the second hingeable coupling portion 21b of the tilt bracket 21, the third tilt link 63 rotates along with the tilt bracket 21, and thus the rotor 72, connected to the third tilt link 63, also rotates. Even if the rotor 72 rotates, the linear guide 71 does not correspondingly rotate since the rotor 72 is coupled to the linear guide 71 to rotate independently of the linear guide 71. In this case, since the third tilt link 63 only rotates in a horizontal direction, rather than additionally moving in a vertical direction, the tilting angle of the camera 10 is maintained during the panning motion. Therefore, the panning motion of the camera 10 is achieved independently of the tilting motion.

As is apparent from the above description, a pan and tilt apparatus usable with a camera according to the present general inventive concept is designed in such a fashion that panning and tilting motions of the camera can be independently performed, and that a tilt motor is fixed on a base independently of the camera. This has the effect of minimizing load on a pan motor, and thus enables effective driving of the pan motor.

Further, according to the present general inventive concept, since a tilting angle of the camera maintains a linear relationship with a rotating angle of the tilt motor, the rotating angle of the tilt motor can be directly utilized to control the tilting angle of the camera, thereby resulting in easy control thereof.

Although an embodiment of the present general inventive concept has been shown and described, it should be appreciated by those skilled in the art that changes may be made in this embodiment without departing from the principles and spirit of the general inventive concept, the scope of which is defined in the claims and their equivalents.

What is claimed is:

1. A pan and tilt apparatus usable with a camera, comprising:
  a tilting driving mechanism comprising:
    a tilt motor to induce a tilting motion of the camera, and
    a transmission shaft coupled to the tilt motor;
  a panning driving mechanism to induce a panning motion of the camera; and
  a link device comprising a first tilt link to transmit a driving force of the tilt motor to the camera such that a tilting angle of the camera varies linearly relative to a rotating angle of the tilt motor, the first tilt link comprising an elongated member having a first end including a rotating center fixedly connected to the transmission shaft which is rotated by the driving force of the tilt motor such that a second end of the first tilt link causes the camera to tilt.

2. The apparatus according to claim 1, wherein the tilting driving mechanism further comprises a decoupling unit to enable the tilting and panning motions of the camera to be independently performed.

3. The apparatus according to claim 2, wherein the panning driving mechanism comprises:
  a main shaft rotatable about a center axis thereof to perform the panning motion; and
  a pan motor to rotate the main shaft.

4. The apparatus according to claim 3, wherein the panning driving mechanism further comprises a belt transmission device to transmit a driving force of the pan motor to the main shaft.

5. The apparatus according to claim 3, further comprising:
a pan bracket fixed to the main shaft to integrally rotate with the main shaft; and
a tilt bracket hingeably coupled to the pan bracket and having the camera mounted thereon to perform the tilting motion.

6. The apparatus according to claim 5, wherein the decoupling unit comprises:
a linear guide that vertically moves along the main shaft; and
a rotor that vertically moves along with the linear guide and being installed to rotate on the linear guide about the main shaft.

7. The apparatus according to claim 6, wherein the decoupling unit further comprises a bearing interposed between the linear guide and the rotor.

8. The apparatus according to claim 6, wherein the link device further comprises:
a second tilt link having a first end hingeably coupled to a second free end of the first tilt link and a second end hingeably coupled to the linear guide to vertically move the decoupling unit; and
a third tilt link having a first end hingeably coupled to the rotor and a second end hingeably coupled to the tilt bracket to vertically rotate the tilt bracket according to vertical movement of the decoupling unit, thereby causing the tilting motion of the camera.

9. The apparatus according to claim 8, wherein a rotating angle of the first tilt link coincides with the tilting angle of the camera.

10. The apparatus according to claim 9, wherein:
a first distance between a hingeable coupling center of the tilt and pan brackets and a hingeable coupling center of the tilt bracket and the third tilt link is equal to a second distance between a rotation center of the first tilt link and a hingeable coupling center of the first and second tilt links; and
a first vertical distance between the hingeable coupling center of the tilt and pan brackets and the rotation center of the first tilt link, a second vertical distance between the hingeable coupling center of the tilt bracket and the third tilt link and the hingeable coupling center of the first and second tilt links, and a third vertical distance between a hingeable coupling center of the rotor and the third tilt link and a hingeable coupling center of the linear guide and the second tilt link, coincide with one another.

11. The apparatus according to claim 8, wherein the tilting driving mechanism further comprises:
gears to transmit the driving force of the tilt motor to the transmission shaft.

12. The apparatus according to claim 11, wherein:
the transmission shaft and a driving shaft of the tilt motor intersect each other; and
the gears are bevel gears.

13. A pan and tilt apparatus usable with a camera, comprising:
a camera to film an object;
one or more brackets to support the camera in a vertically rotatable manner to enable a tilting motion;
a main shaft rotatable about a center axis thereof to enable a panning motion;
a lifting unit that is vertically movable on the main shaft; and
a link device linked to the one or more brackets and the lifting unit to cause the tilting motion.

14. The apparatus according to claim 13, wherein the lifting unit comprises:
a linear guide that vertically moves along the main shaft; and
a rotor that vertically moves along with the linear guide and being installed to rotate on the linear guide about the main shaft.

15. The apparatus according to claim 14, wherein the one or more brackets comprise:
a pan bracket fixed to the main shaft to integrally rotate with the main shaft; and
a lilt bracket hingeably coupled to the pan bracket and having the camera mounted thereon to perform the tilting motion.

16. The apparatus according to claim 15, wherein the link device comprises:
a first tilt link having a rotatable first end at a fixed-position and to rotate;
a second tilt link having a first end hingeably coupled to a second free end of the first tilt link and a second end hingeably coupled to the linear guide to vertically move the lifting unit; and
a third tilt link having a first end hingeably coupled to the rotor and a second end hingeably coupled to the tilt bracket to vertically rotate the tilt bracket according to vertical movement of the lifting unit, thereby causing the tilting motion of the camera.

17. The apparatus according to claim 16, further comprising:
a tilt motor to drive the link device,
wherein a tilting angle of the camera varies linearly relative to a rotating angle of the tilt motor.

18. The apparatus according to claim 16, further comprising:
a pan motor to rotate the main shaft; and
a transmission device to transmit a driving force of the pan motor to the main shaft.

19. An apparatus to pan and tilt a camera disposed thereon, comprising:
a tilt bracket to support the camera;
a shaft to support the tilt bracket;
a tilt motor disposed adjacent to the shaft to provide a driving power;
a lifting unit vertically movable along an outside portion of the shaft; and
a linking unit including a first linking part connected at a first end to the tilt motor to receive the driving power from the tilt motor and connected at a second end to the lifting unit to move the lifting unit accordingly, and a second linking part connected at a first end to the lifting unit to receive the driving power from the lifting unit and connected at a second end to the tilt bracket to tilt the tilt bracket as the lifting unit is moved.

20. The apparatus according to claim 19, wherein the tilt bracket is hingeably attached to the second linking part at a rear portion thereof.

21. The apparatus according to claim 19, wherein the first end of the first linking part is rotatable by a transmission shaft that is disposed perpendicular to the shaft.

22. The apparatus according to claim 21, wherein the first end of the second linking part is connected to the lifting unit opposite to the first linking part.

23. The apparatus according to claim 19, further comprising:
the camera disposed on the tilt bracket.

24. The apparatus according to claim 19, wherein the lifting unit comprises a motion decoupling unit to enable independent tilting and panning motions and having a linear part vertically movable along the shaft and a rotatable part connected to the linear part rotatable about the linear part.

25. The apparatus according to claim 24, wherein the tilting motion causes the linear part and the rotatable part to move along the shaft together and the panning motion causes the rotatable part to rotate with respect to the linear part.

26. A method of controlling a pan and tilt apparatus usable with a camera, the method comprising:
    transmitting a driving power from a driving motor to a transmission shaft via one or more gears, thereby causing the transmission shaft to rotate;
    vertically rotating a first link part connected to the transmission shaft at a first end and a lifting unit at a second end to displace the lifting unit vertically along a main shaft of the pan and tilt apparatus;
    displacing a second link part connected to the lifting unit opposite to the first link part on a first end and a tilting bracket at a second end according to the vertical displacement of the lifting unit; and
    tilting the tilting bracket disposed on the main shaft and having the camera disposed thereon according to the displacement of the second link part.

27. The method according to claim 26, wherein a tilting angle of the tilting bracket varies linearly with respect to a rotating angle of the tilt motor.

28. The method according to claim 26, wherein a tilting angle of the tilting bracket is equal to a rotating angle of the transmission shaft.

29. A pan and tilt apparatus usable with a camera, comprising:
    a tilt bracket to allow the camera to tilt;
    a pan bracket coupled to the tilt bracket to allow the camera to pan;
    a decoupling unit to enable the tilting and panning motions of the camera to be performed simultaneously or separately;
    a tilt motor to induce a tilting motion of the camera;
    a panning driving mechanism to induce a panning motion of the camera; and
    a link device to transmit a driving force of the tilt motor to the camera, comprising:
        a first tilt link comprising an elongated member coupled at one end thereof to the tilt motor to be rotated by the driving force of the tilt motor and coupled at a second end thereof to the decoupling unit such that the decoupling unit tilts the camera when the first tilt link is rotated at the one end by the tilt motor,
        a second tilt link having a first end coupled to a second free end of the first tilt link and a second end coupled to decoupling unit to vertically move the decoupling unit, and
        a third tilt link having a first end coupled to the decoupling unit and a second end coupled to the tilt bracket to vertically rotate the tilt bracket according to the vertical movement of the decoupling unit, thereby causing the tilting motion of the camera.

30. The apparatus according to claim 29, wherein the panning driving mechanism comprises:
    a main shaft rotatable about a center axis thereof to perform the panning motion; and
    a pan motor to rotate the main shaft.

31. The apparatus according to claim 30, wherein the decoupling unit comprises:
    a linear guide to vertically move along the main shaft; and
    a rotor rotatably coupled to the linear guide.

* * * * *